US012705386B1

(12) United States Patent
Baghdadi et al.

(10) Patent No.: US 12,705,386 B1
(45) Date of Patent: Aug. 11, 2026

(54) AUTOMATED SYSTEM TO CLASSIFY, MONITOR, AND PROTECT SENSITIVE DATA AND PROVIDE REGULATION COMPLIANCE

(71) Applicant: Cybral IP LLC, Golden, CO (US)

(72) Inventors: Amr Ali Baghdadi, Dubai (AE); Nour Shawky, Cairo (EG); Mohamed Hamed Abdalla Hammad, Alexandria (EG); Abdelrahman Mahmoud Mohamed Mahmoud, Suez (EG)

( * ) Notice: Subject to any disclaimer, the term of this patent is extended or adjusted under 35 U.S.C. 154(b) by 352 days.

(21) Appl. No.: 18/231,059

(22) Filed: Aug. 7, 2023

(51) Int. Cl.
*G06F 21/62* (2013.01)
*G06F 16/35* (2025.01)
*G06F 40/103* (2020.01)

(52) U.S. Cl.
CPC .......... *G06F 21/6245* (2013.01); *G06F 16/35* (2019.01); *G06F 40/103* (2020.01)

(58) Field of Classification Search
CPC .... G06F 21/6245; G06F 16/35; G06F 40/103; G06F 40/189; G06F 40/191
See application file for complete search history.

(56) References Cited

U.S. PATENT DOCUMENTS 11,755,848 B1 * 9/2023 Dan ....................... G06N 20/00 704/270.1
2024/0291853 A1 * 8/2024 Murphy ................ G06F 40/154
2024/0427994 A1 * 12/2024 Odland .................... G06N 3/08
2025/0013773 A1 * 1/2025 Kamyshenko ...... G06F 21/6227
2025/0045451 A1 * 2/2025 Ramakrishnan ....... G06N 20/10
2025/0139241 A1 * 5/2025 Dabhi .................. G06F 21/554
2025/0200224 A1 * 6/2025 Blackburn .......... G06F 21/6245

* cited by examiner

*Primary Examiner* — Frantz B Jean
(74) *Attorney, Agent, or Firm* — Reilly Intellectual Property Law Firm

(57) ABSTRACT

A network system using artificial intelligence provides a comprehensive and automated solution for sensitive data discovery, classification, regulation compliance, and data protection. The system and method described herein use artificial intelligence and machine learning techniques to provide an accurate, efficient, and customizable solution for sensitive data protection, for both structured and unstructured data and in multiple formats, and in both textual and visual form. The system provides connections to use artificial intelligence to discover, classify and protect data on network devices to: analyze data to identify sensitive information; validate the sensitivity and reduce false positives; match sensitive data with regulations; classify files to international standard labels; train on classified data with custom labels; classify data with the custom labels; suggest security policies for compliance; and assist users in using the system.

20 Claims, 7 Drawing Sheets

600

Key 605

D = Department
L = Label
S = Sensitive Data
R = Regulation

AUTOMATED SYSTEM TO CLASSIFY, MONITOR, AND PROTECT SENSITIVE DATA AND PROVIDE REGULATION COMPLIANCE

FIELD OF THE INVENTION

The technology relates generally to the field of data security and sensitivity, and more particularly, to methods and systems using artificial intelligence (AI) for monitoring and protecting an organization's data, including sensitive data discovery, regulated data matching, international standard data classification, custom data classification, data use monitoring, and data protection.

BACKGROUND OF THE INVENTION

The growing use of digital data has created a need to safeguard sensitive data from unauthorized access, disclosure, or misuse. Regulations such as the General Data Protection Regulation (GDPR), California Consumer Privacy Act (CCPA), Health Insurance Portability and Accountability Act (HIPAA) and others require organizations to ensure that sensitive data is properly protected and that appropriate measures are in place to prevent data breaches and other security incidents.

Identification of business-sensitive data and privacy-regulated data has been traditionally done manually by human experts. A team of privacy and security experts is hired to study the information systems in the organization, determine the information types that are being created, collected, used, or stored and recommend the proper classification of these data and required levels of protection. The team does not analyze each and every piece of data in each information system, but they identify a sample on which they apply international standard classification labels. To label each file or document with these labels, organizations must educate their employees on the classification process and how to assign the correct label to their data manually, which requires considerable expenditure of time and personnel resources.

Some tools exist in the market that integrate manual classification in the document workflow to make it easier for employees to classify the data. However, this approach of manual classification likewise is time-consuming, expensive, prone to errors and inconsistencies and does not provide coverage to all the data in the organization. Moreover, this manual process is not scalable and may not keep pace with the ever-increasing volume and complexity of data.

To overcome these challenges, automated tools have been developed to automate the process of sensitive data discovery and classification. These tools use regular expressions, keywords matching and handcrafted rules to analyze data and identify sensitive information in structured documents, such as personal data, financial data, health data, etc.

However, these automated tools have limitations that can limit their effectiveness and lead to compliance risks. For example, many automated tools are designed to work with specific datatypes or formats, which can limit their scope and effectiveness. This can lead to blind spots and gaps in coverage, leaving sensitive data unprotected.

These tools also tend to generate a high number of false positives and false negatives. False positives occur when non-sensitive data is mistakenly identified as sensitive, while false negatives occur when sensitive data is missed. As many non-sensitive data may share similar structure to some sensitive data, the handcrafted rules and regular expressions used in automated tools detect these non-sensitive data and classify them as sensitive. These handcrafted rules are developed on specific examples and thus they are not able to correctly generalize on unseen examples, which result in misdetections.

Some sensitive data may not follow a well-defined structure that can be captured by handcrafted rules, keywords, or regular expressions, such as personal names and medical diagnosis in unstructured data. This type of sensitive data is not detected, and traditional methods of detection suffer from high false positives and false negatives, making the detection of sensitive data not valuable in production. This can result in sensitive data not being detected leading to inefficient resource allocation and compliance risks.

Context is another important factor that automated tools may not consider. Automated tools may not be able to consider the context in which sensitive data is being used. Conventional automated tools do not have a comprehension of the overall content which can lead to inappropriate data protection measures or missed compliance requirements.

Furthermore, conventional automated tools have a rigid set of rules that cannot be easily customized to fit specific organizational needs or compliance requirements. This results in applying discovery and classification rules that do not fit the type and distribution of the data of the organization, and hence results in mis-classified data and protection risks.

SUMMARY

The present invention provides a comprehensive and automated solution for sensitive data discovery, classification, regulation compliance, and data protection. The system and method described herein use artificial intelligence (AI) and machine learning (ML) techniques to overcome the limitations of traditional automated tools and provide a more accurate, efficient, and customizable solution for sensitive data protection, for both structured and unstructured data in multiple formats, and in both textual and visual form.

In certain embodiments, a system to provide connections to use artificial intelligence to discover, classify and protect data on network devices includes a processor that executes application code instructions to cause the system to: use artificial intelligence to analyze the data to identify sensitive information; use artificial intelligence to validate the sensitivity and reduce false positives; use artificial intelligence to match sensitive data with regulations; use artificial intelligence to classify files to international standard labels; use artificial intelligence to train on classified data with custom labels; use artificial intelligence to classify data with the custom labels; use artificial intelligence to suggest security policies for compliance; and use artificial intelligence to assist users in using the system.

In one example, the system may further include application code instructions to cause the system to display a graphical user interface representing the sensitive data, regulated data and classified data on the network devices and organization departments.

In a further example, the graphical user interface may indicate security alerts for each of the one or more sensitive data based on a color or other visual indication.

In another example, using artificial intelligence to identify sensitive and regulated data is performed with a deep learning algorithm. Output of the identified sensitive data may be used to identify the correct security label for the files containing the data.

In one example, artificial intelligence can be used to perform standard and custom data classification with deep learning that comprehends the content of the document being classified and uses natural languages understanding and vision recognition.

In one example, hardware-targeted optimization can be used to optimize the deep learning models for fast performance on central processing units (CPUs). The output models are used in production to identify and classify the data.

In a further example, artificial intelligence can be used to represent the data in an intermediate representation that is only readable by the deep learning models, to enable secure data transmission to be processed by artificial intelligence on cloud based platforms.

In one example, the system further comprises application code instructions to cause the system to build a graph of identified sensitive data per file to identify regulations protecting each file.

DETAILED DESCRIPTION

Example System Architecture

Figure 1:
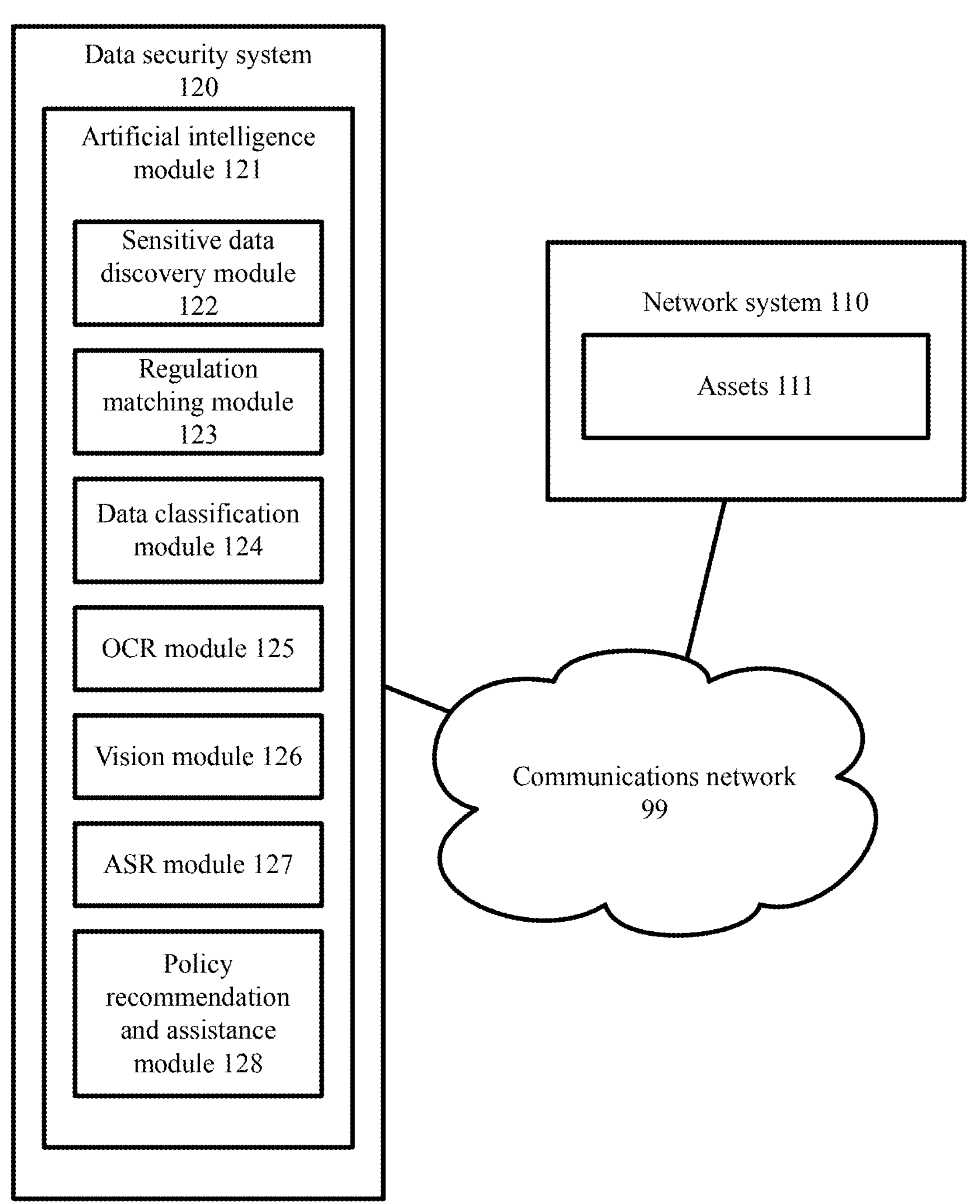
FIG. 1 is a block diagram depicting a system to use artificial intelligence to provide an automated system to identify sensitive and regulated data, match data to regulations, classify data with international standard labels, classify data with custom labels, and recommend protection policies and provide automated answers on the protection policies.

FIG. 1 is a block diagram depicting a system to use artificial intelligence to provide an automated system to identify sensitive and regulated data, identify matched regulations, classify data with international standard labels, classify data with custom labels, and recommend protection policies, in accordance with certain examples. As depicted in FIG. 1, architecture 100 includes a network system 110, and a data security system 120 that are connected by communications network 99.

Each network, such as communication network 99, includes a wired or wireless telecommunication mechanism and/or protocol by which the components depicted in FIG. 1 can exchange data. For example, each network 99 can include a local area network (LAN), a wide area network (WAN), an intranet, an Internet, a mobile telephone network, a storage area network (SAN), a personal area network (PAN), a metropolitan area network (MAN), a wireless local area network (WLAN), a virtual private network (VPN), a cellular or other mobile communication network, Bluetooth, near field communication (NFC), WiFi, or any combination thereof or any other appropriate architecture or system that facilitates the communication of signals or data. Throughout the discussion of example embodiments, the terms "data" and "information" are used interchangeably herein to refer to text, images, audio, video, or any other form of information that can exist in a computer-based environment. The communication technology utilized by the components depicted in FIG. 1 may be similar to network technology used by network 99 or an alternative communication technology.

Each component depicted in FIG. 1 includes a computing device having a communication application capable of transmitting and receiving data over the network 99 or a similar network. For example, each can include a server, desktop computer, laptop computer, tablet computer, a television with one or more processors embedded therein and/or coupled thereto, smart phone, handheld or wearable computer, personal digital assistant (PDA), other wearable device such as a smart watch or glasses, wireless system access point, or any other processor-driven device.

In the example embodiment depicted in FIG. 1, the network system 110 is operated by a network operator, a network designer, or other user that may use the network system 110 to operate a system or communicate to other devices to access services or data. The data security system 120 is operated by an operator, an IT administrator, or other user that may use the data security system 120 to operate a system or communicate to other devices to perform services. While each server, system, and device shown in the architecture is represented by one instance of the server, system, or device, multiple instances of each can be used.

As shown in FIG. 1, the network system 110 includes one or more assets 111. The assets 111 may be any devices, nodes, servers, software, cloud computing devices, hardware, or any other types of assets that are part of the network system 110 for performing tasks, storing data, providing services, communicating with users, communicating with third-party devices, or performing any other suitable actions.

As shown in FIG. 1, the data security system 120 represents any device, computing system, organization, cloud computing system, or other device or system that is suitable to provide methods or systems to use artificial intelligence to provide an automated system to identify sensitive and regulated data, identify matched regulations, classify data with international standard labels, classify data with custom labels and recommend protection policies to protect the data. The data security system 120 may include an AI module 121. The AI module 121 may host, operate, manage, or otherwise provide an AI system that performs AI functions such as machine learning, deep learning, graph convolution networks, neural networks, or any other type of AI functions. The AI functions may be performed by any type of hardware, software, algorithm, server, network, or other type of device or service that provides AI functions.

The AI module 121 hosts functions to perform certain tasks as described herein. In certain examples, the tasks are not performed by separate functions, but are described as different functions herein for clarity. The AI module 121 includes a sensitive data discovery module 122. The sensitive data discovery module 122 may perform any suitable AI algorithm, method, or operation to gather or receive data required to discover sensitive data on the network system 110, analyze the relations between sensitive data types, and reduce false positive detections.

The AI module 121 includes a regulation matching module 123. The regulation matching module 123 may perform any suitable AI algorithm, method, or operation to map the identified sensitive data on network system 110 to data regulations for compliance.

The AI module 121 includes a data classification module 124. The data classification module 124 may perform any suitable AI algorithm, method, or operation to automate the implementation of the data classification with international standard labels and custom labels.

The AI module 121 includes an optical character recognition (OCR) module 125. The OCR module 125 may perform any suitable AI algorithm, method, or operation to create and extract text data from visual data on the network system 110 to identify and classify sensitive data.

The AI module 121 includes a vision module 126. The vision module 126 may perform any suitable AI algorithm, method, or operation to analyze visual data on the network system 110 to identify and classify sensitive data.

The AI module 121 includes an automatic speech recognition (ASR) module 127. The ASR module 127 may perform any suitable AI algorithm, method, or operation to create and extract text data from audio data on the network system 110 to identify and classify sensitive data.

The AI module 121 includes a policy recommendation and assistance module 128. The policy recommendation and assistance module 128 may perform any suitable AI algorithm, method, or operation to recommend the suitable data classification and protection policy given the business domain, type and region coverage of the organization.

Figure 7:
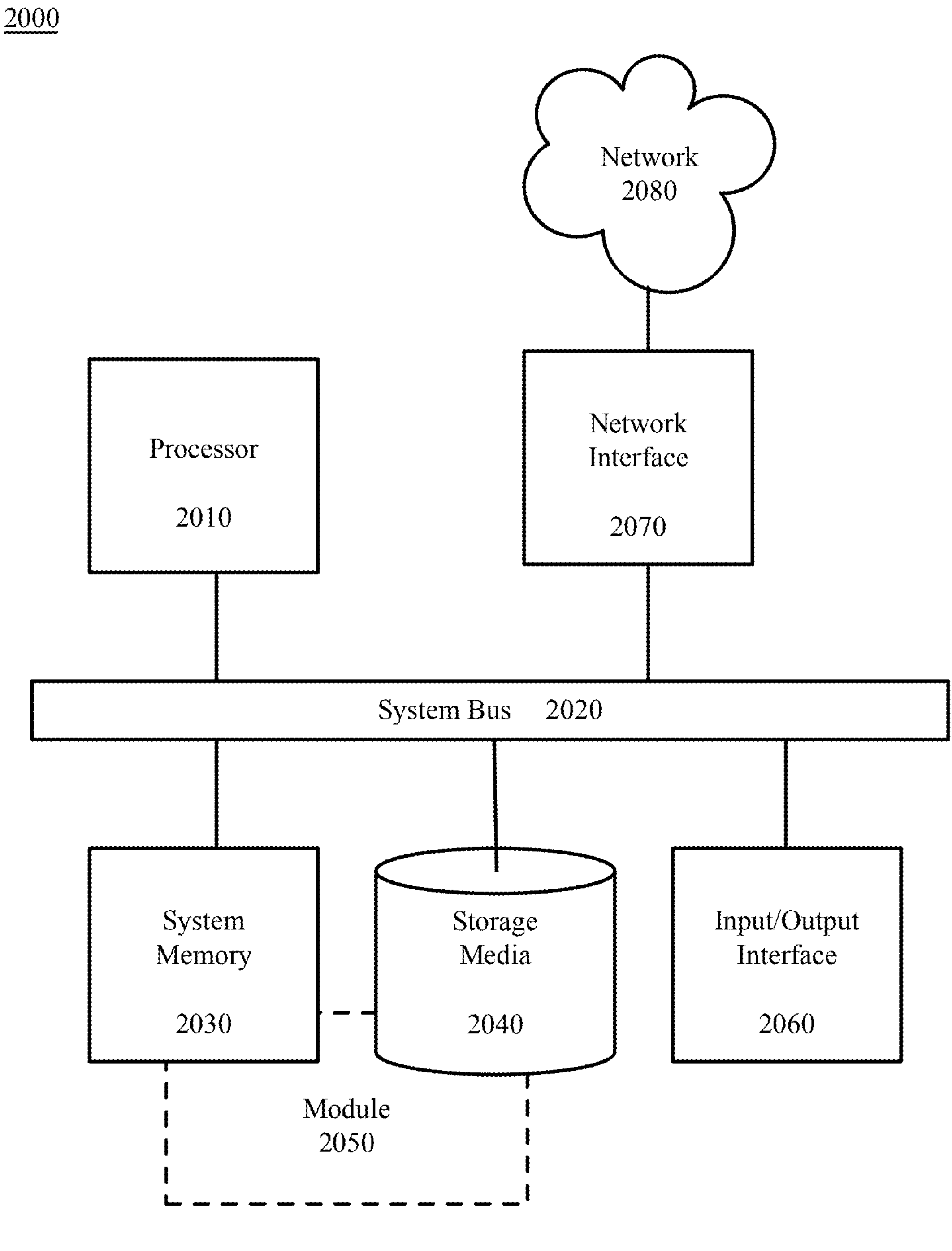
FIG. 7 depicts a computing machine and a module.

In example embodiments, the network computing devices and any other computing machines associated with the technology presented herein may be any type of computing machine such as, but not limited to, those discussed in more detail with respect to FIG. 7. Furthermore, any functions, applications, or components associated with any of these computing machines, such as those described herein or any others (for example, scripts, web content, software, firmware, hardware, or modules) associated with the technology presented herein may by any of the components discussed in more detail with respect to FIG. 7. The computing machines discussed herein may communicate with one another, as well as with other computing machines or communication systems over one or more networks, such as network 99. The network 99 may include any type of data or communications network, including any of the network technology discussed with respect to FIG. 7.

EXAMPLE EMBODIMENTS

Reference will now be made in detail to embodiments of the invention, one or more examples of which are illustrated in the accompanying drawings. Each example is provided by way of explanation of the invention, not as a limitation of the invention. Those skilled in the art will recognize that various modifications and variations can be made in the present invention without departing from the scope or spirit of the invention. For example, features illustrated or described as part of one embodiment can be used in another embodiment to yield a still further embodiment. Thus, the technology covers such modifications and variations that come within the scope of the invention.

The technology for embodiments of the invention may employ methods and systems to use artificial intelligence to provide an automated system to identify sensitive and regulated data, identify matched regulations, classify data with international standard labels, classify data with custom labels, and recommend protection policies. To accomplish this, the AI module 121 analyzes data content along with regulations' requirements and security frameworks. Some or all of these steps and actions may be performed using AI, while some of these steps and actions may be performed by an automated system.

The examples for embodiments of the invention may employ computer hardware and software, including, without limitation, one or more processors coupled to memory and non-transitory computer-readable storage media with one or more executable computer application programs stored thereon, which instruct the processors to perform such methods.

The example methods illustrated in FIGS. 2-5 are described hereinafter with respect to the components of the example communications and processing architecture 100.

Figure 2:
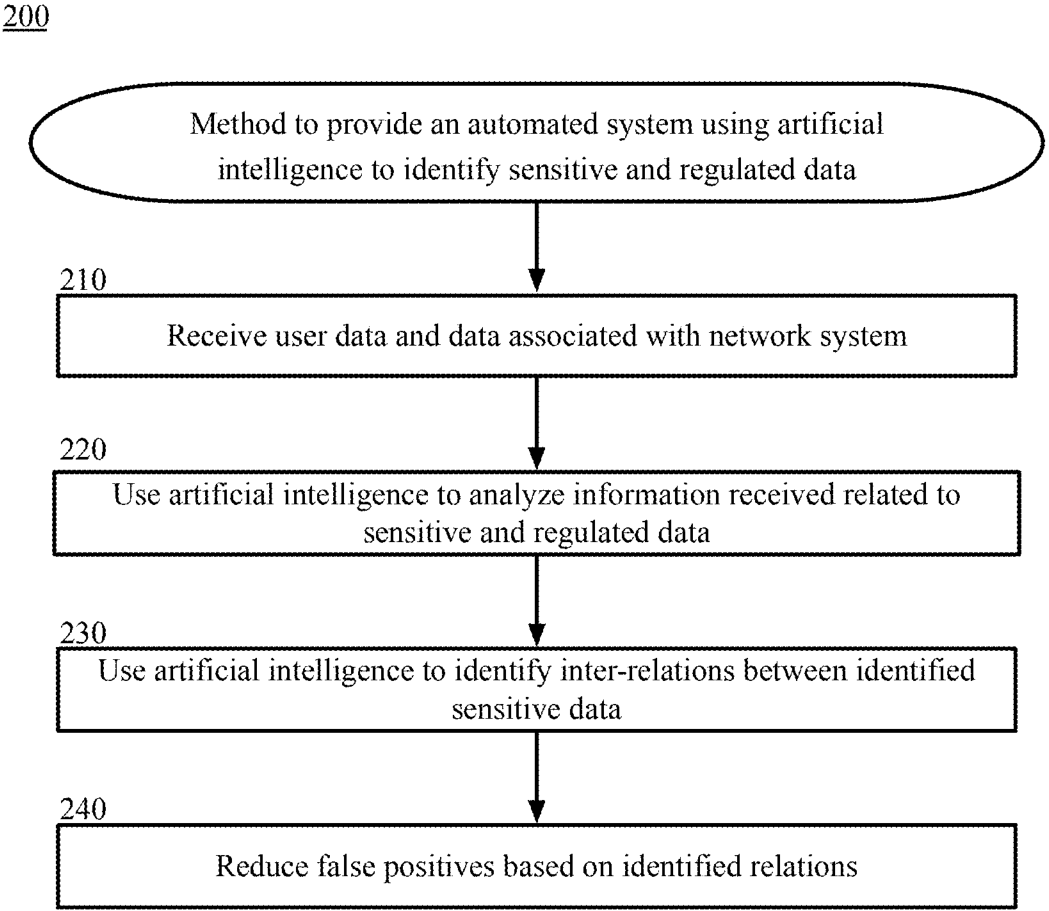
FIG. 2 is a block flow diagram depicting a method to provide an automated system using artificial intelligence to identify sensitive and regulated data.

FIG. 2 is a block flow diagram depicting a method 200 to provide an automated system using artificial intelligence to identify sensitive and regulated data, in accordance with certain examples.

In block 210, the data security system 120 receives user data and data associated with network system 110. The data security system 120 receives data from the network system 110 directly, such as via the network 99, from operators of the data security system 120 or the network system 110, from third-party sources, or from any other suitable source.

In block 220, the data security system 120 uses artificial intelligence to analyze information received related to sensitive and regulated data. The data security system 120 identifies from inputs associated with the received data, which parts of the data are considered sensitive and which parts of the data are not considered sensitive. As more sensitive data is used for training, the sensitive data discovery module 122 is able to learn to identify these types of sensitive data in both structured and unstructured formats.

In block 230, the data security system 120 uses artificial intelligence to identify inter-relations between identified sensitive data. For example, the data security system 120 can identify if an extracted personal name is related with an extracted date information from the document, and determine the type of relation to be date of birth, date of hiring, date of diagnosis, etc.

In block 240, the data security system 120 uses the results of block 230 to reduce false positives resulting from block 220. If there are no sensitive relations found between the extracted information, this information is discarded as sensitive data. For example, if a personal name and a date are extracted from a document as sensitive data, and no sensitive relation is found between them, the date is discarded and not reported as sensitive information.

Figure 3:
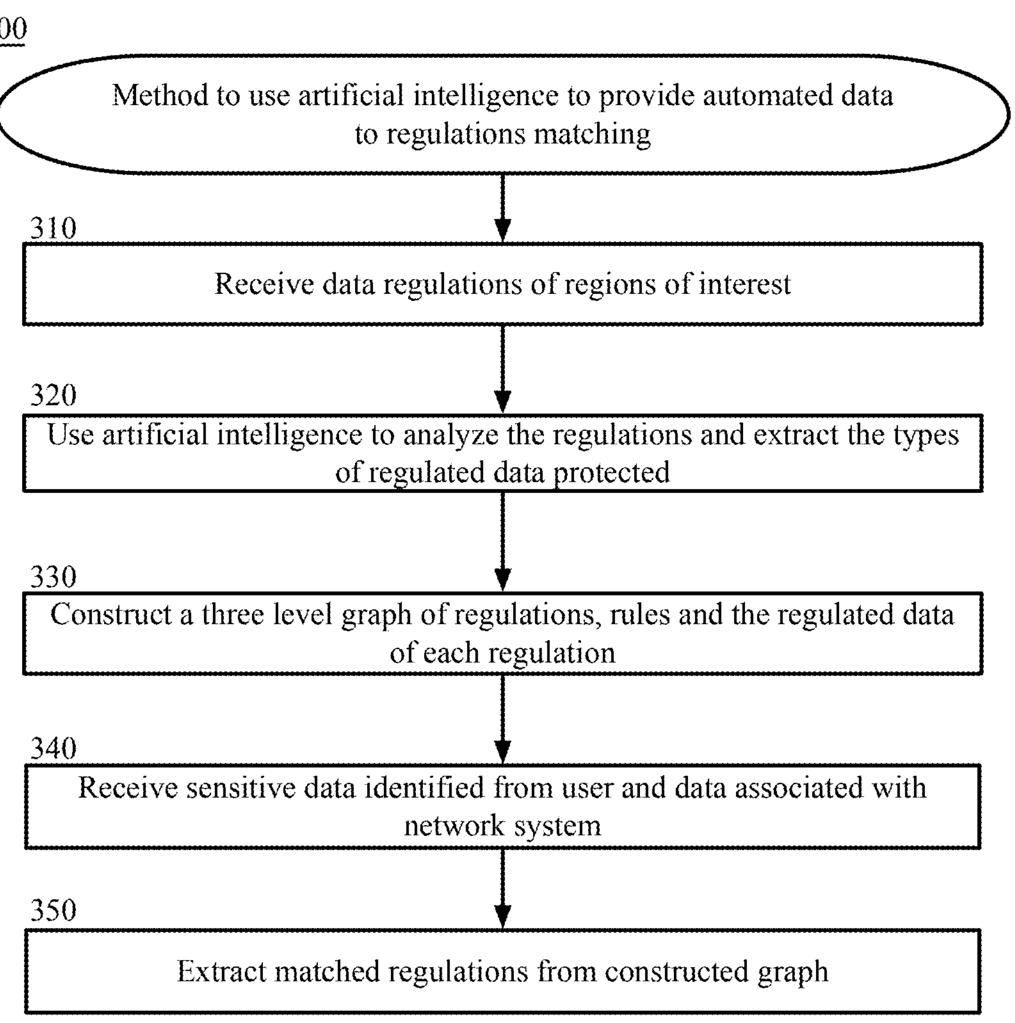
FIG. 3 is a block flow diagram depicting a method to use artificial intelligence to provide automated data to regulations matching.

FIG. 3 is a block flow diagram depicting a method 300 to use artificial intelligence to provide automated data to regulations matching, in accordance with certain examples.

In block 310, the data security system 120 receives regulations documents for the supported geographic regions. As new data regulations are approved or introduced, the documentations and descriptions of these regulations are received and updated in the data security system 120.

In block 320, the data security system 120 uses artificial intelligence to analyze the regulations descriptions, documentations, and extract requirements. A large language model that can process natural language is used to analyze the regulations and extract the requirements as entities, relations, and extra rules.

In block 330, the extracted regulations requirements and rules are used to construct a three level graph of regulations, rules, and the regulated data of each regulation. Level 1 is composed of the regulations' names. Level 2 contains the rules extracted for each regulation. Level 3 consists of the sensitive data involved in each rule. The graph is updated as new regulations are introduced and added to be supported by the system. The graph is traversed to query sensitive data that the system is trained to discover, and the regulations to match. The graph is displayed to the IT administrator to see the regulations decomposed into rules, and how the regulation matching logic works.

In block 340, the data security system 120 receives sensitive data identified from users and data associated with network system 110, as previously described herein with reference to method 200 of FIG. 2. The discovered sensitive data from user data and data associated with network system 110 is used to traverse the graph generated in block 330 and match the data to regulations in block 350. For example, given that a specific document contains a personal name, credit card number, bank account number, and that the organization's business domain is financial and operates in the United States, this information is populated in the graph and the graph is traversed top-down to check the regulation that matches this document. This process is done for every document in the organization.

Figure 4:
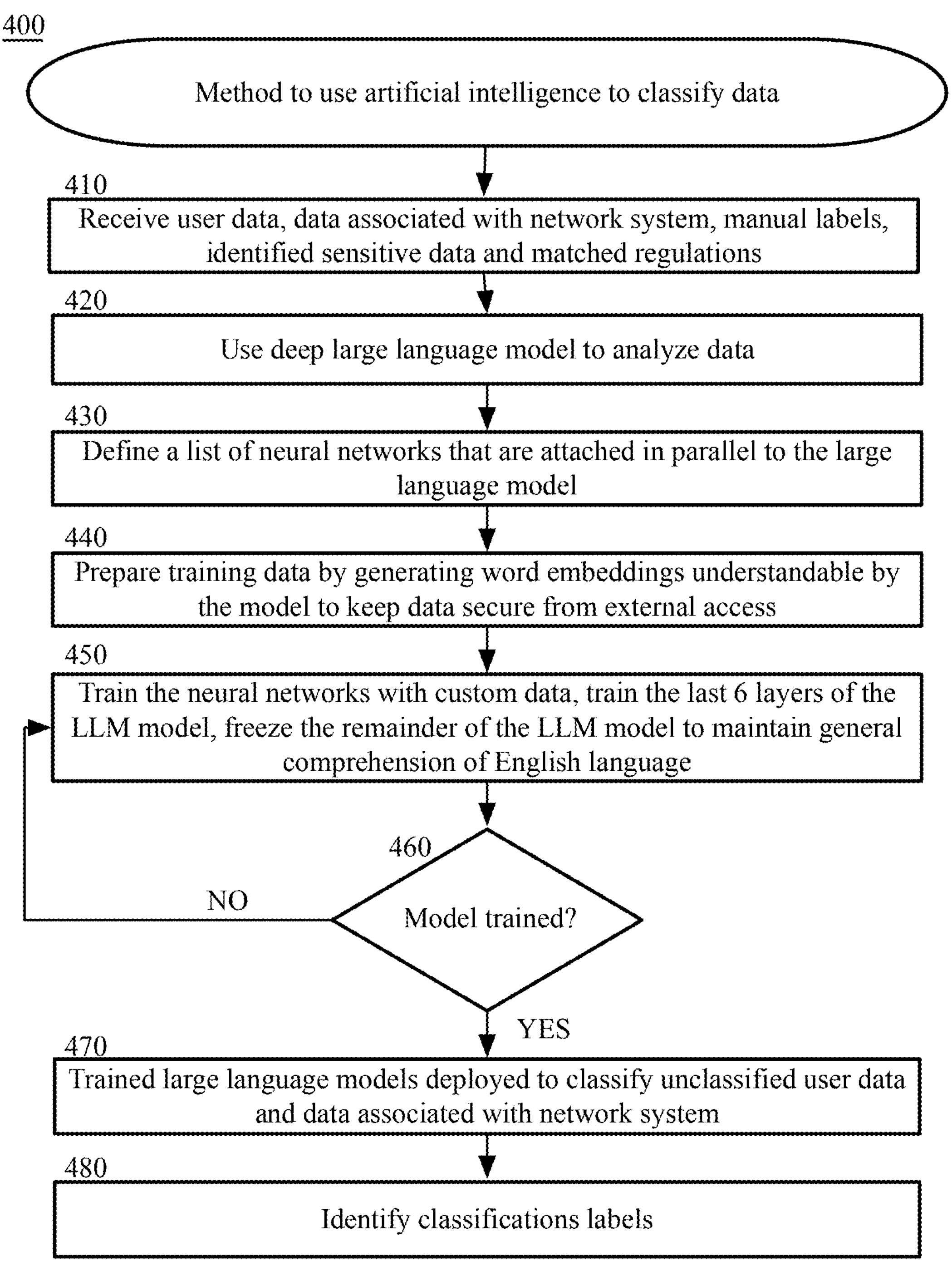
FIG. 4 is a block flow diagram depicting a method to use artificial intelligence to classify data.

FIG. 4 is a block flow diagram depicting a method 400 to use artificial intelligence to classify data, in accordance with certain examples.

In block 410, the data security system 120 receives user data; data associated with network system 110; manual labels; identified sensitive data, as described herein with reference to method 200 of FIG. 2; and matched regulations, as described herein with reference to method 300 of FIG. 3.

In block 420, the data classification module 124 uses a deep large language model (LLM) to analyze the received data from block 410 to generate a latent space document representation vector that represents all the information associated with the collected data. The vector encodes the information in a mathematical format that can be processed by the model and cannot be understandable by humans. The vector dimension can be varied such that with a larger dimension more fine-grained information can be encoded. In an example, the vector dimension is 512.

In block 430, the data classification module 124 defines a list of neural networks that are attached in parallel to the large language model in block 420. Each neural network is used to classify the user data and data associated with network system 110 per each group of classification labels. The group of classification labels can be either international standard classification labels, such as International Organization for Standardization (ISO) ISO27001 and National Institute of Standards (NIST) classification, or can be custom classification labels defined by the network system operator.

In block 440, the data classification module 124 prepares training data by generating word embeddings understandable by the large language model to keep data secure from external access. In an example, the data is secure from human access as the stored embeddings are not human understandable. The stored embeddings are vectors of mathematical numbers that cannot be reversed back to raw text or image. The training data is used to train the neural networks defined in block 430. The data classification module 124 uses the large language model to generate word embedding representations, i.e., custom data, of the data to store the word embedding representations securely instead of storing the raw data. The word embedding representation is only understandable by the large language model and the defined neural networks and cannot be reversed or converted back to a raw data format.

In block 450, the data classification module 124 trains the neural networks defined in block 430 with custom data, i.e., the word embeddings prepared in block 440, and custom labels. For fast and accurate training, the data classification module 124 trains the last 6 layers of the large language model along with the defined neural networks, and freezes the remainder of the large language model to maintain general comprehension of the English language, for example.

In block 460, the data classification module 124 determines if the models are trained. The models may be determined to be trained when the models are able to pass a test accuracy threshold on the test data. The test data is part of the data prepared in block 440 that is kept away from training the models to be used to test the models. If the models are not trained, the method 400 follows the NO path back to block 450 for additional training, such as by providing additional training data inputs. If the model is trained, the method 400 follows the YES path to block 470.

In block 470, the trained large language models are deployed and used to classify unclassified user data and data associated with network system 110. In an example, unclassified user data and data associate with the network system 100 are input into the large language model and classifier neural networks.

In block 480, the trained large language models rank classification labels from each classification group of labels created by the IT administrator to classify the files automatically. For example, if the IT administrator creates a classification group that contains the labels "Public", "Restricted", "Internal", "External" and "Confidential", the trained large language model will analyze a given document for classification and will rank each label based on how it is suitable to be applied to the given document.

Figure 5:
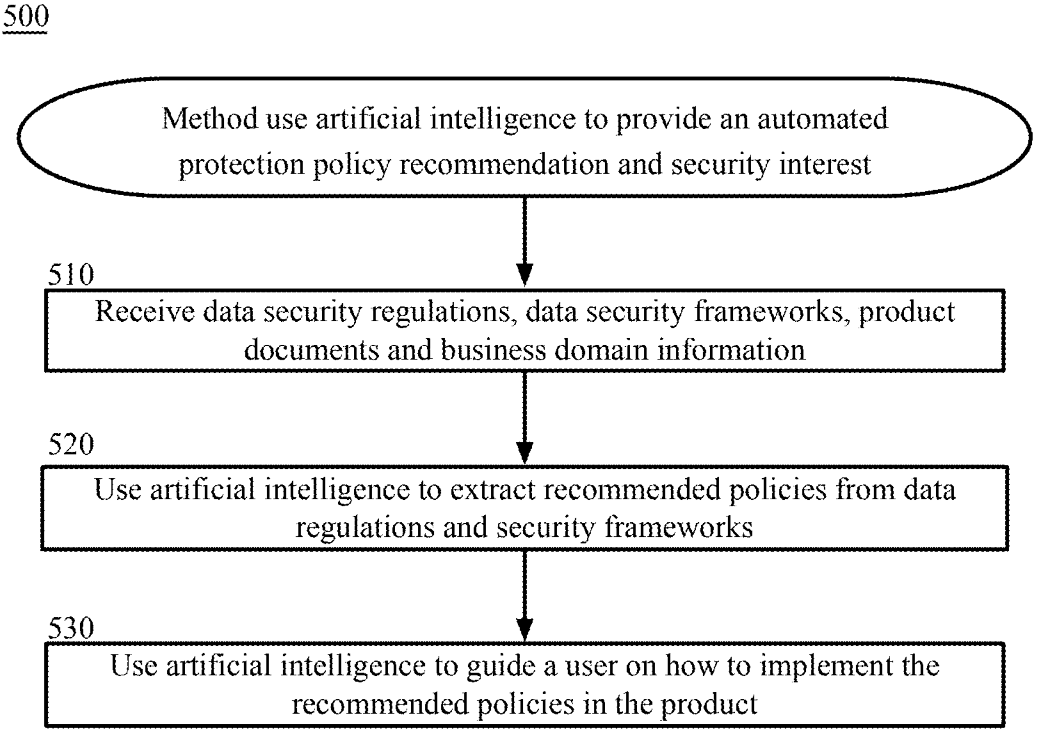
FIG. 5 is a block flow diagram depicting a method to use artificial intelligence to provide an automated protection policy recommendation and security interest.

FIG. 5 is a block flow diagram depicting a method 500 to use artificial intelligence to provide an automated protection policy recommendation and security interest, including data security knowledge and best practices, in accordance with certain examples.

In block 510, data security regulations, frameworks, product documents and business domain information, including best practices, are received to construct a database that represents a knowledge base upon which artificial intelligence is used to recommend protection policies and best practices. The data is stored as text data and indexed documents that can be searched semantically.

In block 520, artificial intelligence is used to extract recommended policies from the collected data of block 510. The policy recommendation and assistance module 128 uses a large language model augmented with search algorithms to extract relevant policies from the knowledge base created in block 510. The large language model analyzes the network system operator question and extracts the keywords that will be used to search the knowledge base. The search algorithm uses the keywords and queries the knowledge base for the relevant policies and documents. The large language model analyzes these policies and documents along with the original question and recommends the best policy and practices as a chat dialogue.

In block 530, artificial intelligence is used to guide a user on how to implement the recommended policies in the product. For example, the system operator is further guided on how to implement the recommended policies and best practices through the data security system 120. The large language model analyzes the documentation of the data security system 120 along with the recommended policies and describes steps to implement them. If a policy or rule is not supported by the data security system 120, the large language model specifies that the policy or rule is not supported and suggests tools that can be considered for integration to implement the missing step.

Figure 6:
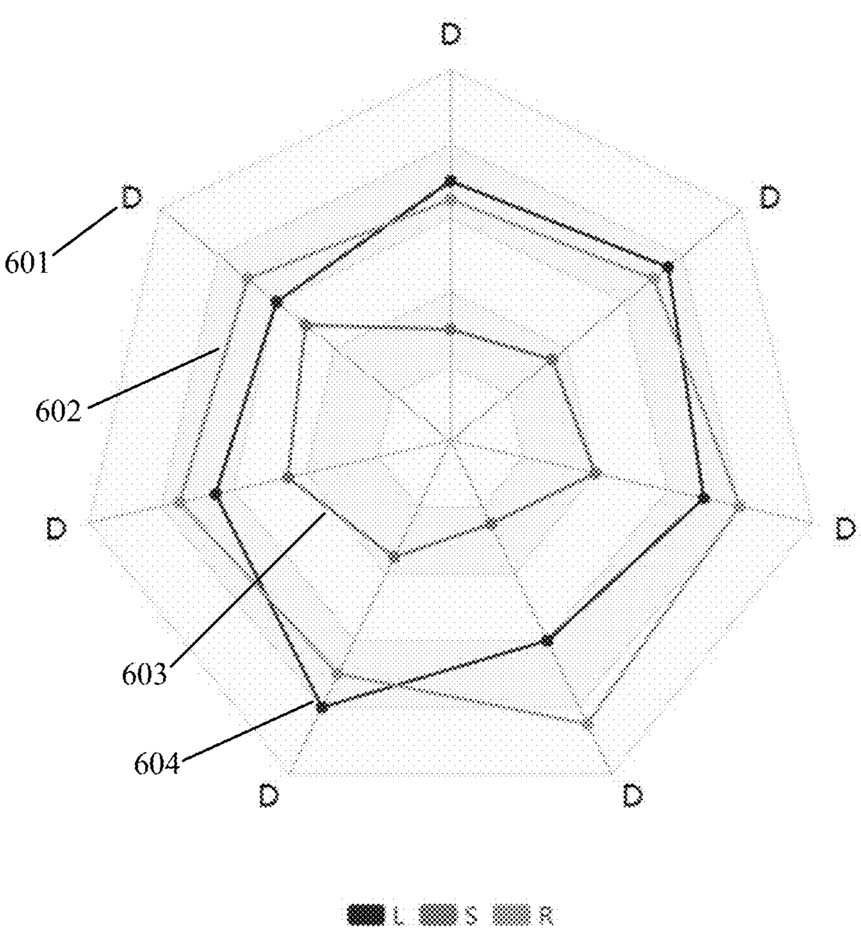
FIG. 6 is an illustration of an example graphical user interface to represent classified data per organization departments.

FIG. 6 is an illustration of an example graphical user interface 600 to represent identified sensitive data, matched regulations, and classified data across departments in a network system 110. The graphical user interface 600 depicts each department of the network system 110 as a perimeter vertex representing a node of the network system 110 and depicts each output as a colored graph.

The graphical user interface 600 has a key 605 that describes the meaning of the different depictions. For example, a node with a D displayed, such as node 601, is a department in the organization.

A graph colored with the R key color, such as 602, is a graph that represents the number of documents matched with the regulation R per each department D.

A graph colored with the S key color, such as node 603, is a graph that represents the number of documents or files with identified sensitive data S per each department D.

A graph colored with the L key color, such as node 604, is a graph that represents the number of documents classified with the label L per each department D.

Example Machine Learning Processes

Machine Learning

Machine learning is a field of study within artificial intelligence that allows computers to learn functional relationships between inputs and outputs without being explicitly programmed. Machine learning involves a module comprising algorithms that may learn from existing data by analyzing, categorizing, or identifying the data. Such machine-learning algorithms operate by first constructing a model from training data to make predictions or decisions expressed as outputs. Although example embodiments are presented with respect to a few machine-learning algorithms, the principles presented herein may be applied to other machine-learning algorithms.

Data supplied to a machine learning algorithm can be considered a feature, which can be described as an individual measurable property of a phenomenon being observed. The concept of feature is related to that of an independent variable used in statistical techniques such as those used in linear regression. The performance of a machine learning algorithm in pattern recognition, classification and regression may be dependent on choosing informative, discriminating, and independent features. Features may comprise numerical data, categorical data, time-series data, strings, graphs, or images. Reinforcement learning is a subfield of machine learning that trains an agent in an environment, and the agent takes actions to achieve the final objective. The agent should take the actions that maximize the accumulative reward. The agent learns by trial and error.

In order for the deep reinforcement learning modules or algorithms practicing the methods described herein to reach the required accuracy and to generalize, certain parameters may be needed. For example, in certain systems, a machine learning algorithm should be trained on a diverse set of networks and may be tasked with bypassing security measures. The state space should be represented properly to assure convergence.

To address these challenges, the systems described herein may introduce the following approaches. First, the system may use generative models to generate different network parameters that support a diverse set of topologies. The system may employ multi-agent reinforcement learning. The system may also employ leaf injection of algorithms as actions.

The reinforcement-learning machine learning algorithms may be trained on a diverse range of environments to be able to generalize. To achieve this, the system may use the following approach. The system may consider different network topologies, consider the presence of firewalls/anti-viruses, consider other security measures that might exist, and consider that the key parameters that define the environment/technology stack are variables. The system may utilize these factors in the training data selection or usage.

Bayesian Network

In one example embodiment, the machine learning may use a Bayesian Network (BN). BNs are used in machine learning to make predictions through Bayesian inference from probabilistic graphical models. In BNs, input features are mapped onto a directed acyclic graph forming the nodes of the graph. The edges connecting the nodes contain the conditional dependencies between nodes to form a predicative model. For each connected node the probability of the input features resulting in the connected node is learned and forms the predictive mechanism. The nodes may comprise the same, similar, or different probability functions to determine movement from one node to another. The nodes of a Bayesian network are conditionally independent of its non-descendants given its parents thus satisfying a local Markov property. This property affords reduced computations in larger networks by simplifying the joint distribution.

Multi-Agent Reinforcement Learning

In one example, the machine learning may use a multi-agent reinforcement learning (MARL) approach. MARL can be used in a variety of domains. The agents may represent machine learning algorithms or any other machine learning functions. MARL is an iterative learning process where agents interact with an environment based on state, actions, and rewards. The state represents a particular configuration of the environment, the actions are the options the agents have available to interact with to modify the environment, and the reward is a signal used to define the task of the agent.

Leaf injection of Algorithms

Reinforcement learning agents may represent machine learning algorithms or any other machine learning functions. The reinforcement learning module may be designed to support injection of other algorithms without the need for modification. The injection of new algorithms may be an automatic ongoing process.

Embedding

In one example, the machine learning module may use embedding to provide a lower dimensional representation, such as a vector, of features to organize them based off respective similarities. In some situations, these vectors can become massive. In the case of massive vectors, particular values may become very sparse among a large number of values (e.g., a single instance of a value among 50,000 values). Because such vectors are difficult to work with, reducing the size of the vectors, in some instances, is necessary. A machine learning module can learn the embeddings along with the model parameters. In example embodiments, embedded semantic meanings are utilized. Embedded semantic meanings are values of respective similarity. For example, the distance between two vectors, in vector space, may imply two values located elsewhere with the same distance are categorically similar. Embedded semantic meanings can be used with similarity analysis to rapidly return similar values. In example embodiments, the methods herein are developed to identify meaningful portions of the vector and extract semantic meanings between that space.

Training Methods

In example embodiments, the machine learning module can be trained using techniques such as unsupervised, supervised, semi-supervised, reinforcement learning, transfer learning, incremental learning, curriculum learning techniques, and/or learning to learn. Training typically occurs after selection and development of a machine learning module and before the machine learning module is operably in use.

In an example embodiment, unsupervised learning is implemented. Unsupervised learning can involve providing all or a portion of unlabeled training data to a machine learning module. The machine learning module can then determine one or more outputs implicitly based on the provided unlabeled training data. In an example embodiment, supervised learning is implemented. Supervised learning can involve providing all or a portion of labeled training data to a machine learning module, with the machine learning module determining one or more outputs based on the provided labeled training data, and the outputs are either accepted or corrected depending on the agreement to the actual outcome of the training data. In some examples, supervised learning of machine learning system(s) can be governed by a set of rules and/or a set of labels for the training input, and the set of rules and/or set of labels may be used to correct inferences of a machine learning module.

In one example embodiment, semi-supervised learning is implemented. Semi-supervised learning can involve providing all or a portion of training data that is partially labeled to a machine learning module. During semi-supervised learning, supervised learning is used for a portion of labeled training data, and unsupervised learning is used for a portion of unlabeled training data. In one example embodiment, reinforcement learning is implemented. Reinforcement learning can involve first providing all or a portion of the training data to a machine learning module and as the machine learning module produces an output, the machine learning module receives a "reward" signal in response to a correct output. Typically, the reward signal is a numerical value, and the machine learning module is developed to maximize the numerical value of the reward signal. In addition, reinforcement learning can adopt a value function that provides a numerical value representing an expected total of the numerical values provided by the reward signal over time.

In one example embodiment, transfer learning is implemented. Transfer learning techniques can involve providing all or a portion of a first training data to a machine learning module, then, after training on the first training data, providing all or a portion of a second training data. In example embodiments, a first machine learning module can be pre-trained on data from one or more computing devices. The first trained machine learning module is then provided to a computing device, where the computing device is intended to execute the first trained machine learning model to produce an output. Then, during the second training phase, the first trained machine learning model can be additionally trained using additional training data, where the training data can be derived from kernel and non-kernel data of one or more computing devices. This second training of the machine learning module and/or the first trained machine learning model using the training data can be performed using either supervised, unsupervised, or semi-supervised learning. In addition, it is understood transfer learning techniques can involve one, two, three, or more training attempts. Once the machine learning module has been trained on at least the training data, the training phase can be completed. The resulting trained machine learning model can be utilized as at least one of trained machine learning module.

In one example embodiment, incremental learning is implemented. Incremental learning techniques can involve providing a trained machine learning module with input data that is used to continuously extend the knowledge of the trained machine learning module. Another machine learning training technique is curriculum learning, which can involve training the machine learning module with training data arranged in a particular order, such as providing relatively easy training examples first, then proceeding with progressively more difficult training examples. As the name suggests, difficulty of training data is analogous to a curriculum or course of study at a school.

In one example embodiment, learning to learn is implemented. Learning to learn, or meta-learning, comprises, in general, two levels of learning: quick learning of a single task and slower learning across many tasks. For example, a machine learning module is first trained and comprises of a first set of parameters or weights. During or after operation of the first trained machine learning module, the parameters or weights are adjusted by the machine learning module. This process occurs iteratively on the success of the machine learning module. In another example, an optimizer, or another machine learning module, is used wherein the output of a first trained machine learning module is fed to an optimizer that constantly learns and returns the final results. Other techniques for training the machine learning module and/or trained machine learning module are possible as well.

In some examples, after the training phase has been completed but before producing predictions expressed as outputs, a trained machine learning module can be provided to a computing device where a trained machine learning module is not already resident, in other words, after training phase has been completed, the trained machine learning module can be downloaded to a computing device. For example, a first computing device storing a trained machine learning module can provide the trained machine learning module to a second computing device. Providing a trained machine learning module to the second computing device may comprise one or more of communicating a copy of trained machine learning module to the second computing device, making a copy of trained machine learning module for the second computing device, providing access to trained machine learning module to the second computing device, and/or otherwise providing the trained machine learning system to the second computing device. In example embodiments, a trained machine learning module can be used by the second computing device immediately after being provided by the first computing device. In some examples, after a trained machine learning module is provided to the second computing device, the trained machine learning module can be installed and/or otherwise prepared for use before the trained machine learning module can be used by the second computing device.

After a machine learning model has been trained it can be used to output, estimate, infer, predict, generate, or determine, for simplicity these terms will collectively be referred to as results. A trained machine learning module can receive input data and operably generate results. As such, the input data can be used as an input to the trained machine learning module for providing corresponding results to kernel components and non-kernel components. For example, a trained machine learning module can generate results in response to requests. In example embodiments, a trained machine learning module can be executed by a portion of other software. For example, a trained machine learning module can be executed by a result daemon to be readily available to provide results upon request.

In example embodiments, a machine learning module and/or trained machine learning module can be executed and/or accelerated using one or more computer processors and/or on-device co-processors. Such on-device co-processors can speed up training of a machine learning module and/or generation of results. In some examples, a trained machine learning module can be trained, reside, and execute to provide results on a particular computing device, and/or otherwise can make results for the particular computing device.

Input data can include data from a computing device executing a trained machine learning module and/or input data from one or more computing devices. In example embodiments, a trained machine learning module can use results as input feedback. A trained machine learning module can also rely on past results as inputs for generating new results.

Algorithms

Different machine-learning algorithms have been contemplated to carry out the embodiments discussed herein. For example, linear regression (LiR), Bayesian networks (for example, naive-bayes), neural networks (NN) (also known as artificial neural networks), a suitable statistical machine learning algorithm, and/or a heuristic machine learning system may be used.

Reinforcement Learning

In reinforcement learning, there are two approaches, either model based or model free. Model based are more in the planning area. Model-based approaches are used when the internal operation of the environment is known. It is known what next State and Reward will be output by the environment when some Action is performed from some Current State. Model free methods rely on the learning. They are used when the environment is very complex, and its internal dynamics are not known. They treat the environment as a black box. The approach contemplated in the present invention lies in the model free methods.

Model free algorithms are either value based or policy based. Value based algorithms finds the optimal policy indirectly through finding optimal state-action value. Examples of value-based algorithms are SARSA, Qlearning, and deep Q learning. Current proposed approach uses Deep Q Learning (DQN).

Other policy-based approaches can be considered. Policy based approach finds the optimal policy directly. Policy gradient methods are a very popular approach in this area. Examples of this approach include REINFORCE method and actor critic.

Policy gradient relies upon optimizing parametrized policies with respect to the expected return by gradient descent. In this approach the policy is represented by its function approximator and is updated based on the expected accumulated reward.

Actor-Critic

Actor-critic algorithm learns a policy function and a value function. The policy function objective is to make decisions, and the value function helps improve the training process. It is a TD (Temporal Difference) method that has a separate memory structure to explicitly represent the policy independent of the value function. The policy structure is known as the actor, because it is used to select actions, and the estimated value function is known as the critic, because it criticizes the actions made by the actor. Learning is always on-policy: the critic must learn about and critique whatever policy is currently being followed by the actor. The critique takes the form of a TD error.

Linear Regression (LiR)

In one example embodiment, linear regression machine learning is implemented. LiR is typically used in machine learning to predict a result through the mathematical relationship between an independent and dependent variable. A simple linear regression model would have one independent variable (x) and one dependent variable (y). A representation of an example mathematical relationship of a simple linear regression model would be $y=mx+b$. In this example, the machine learning algorithm tries variations of the tuning variables m and b to optimize a line that includes all the given training data.

The tuning variables can be optimized, for example, with a cost function. A cost function takes advantage of the minimization problem to identify the optimal tuning variables. The minimization problem preposes the optimal tuning variable will minimize the error between the predicted outcome and the actual outcome. An example cost function may comprise summing all the square differences between the predicted and actual output values and dividing them by the total number of input values and results in the average square error.

To select new tuning variables to reduce the cost function, the machine learning module may use, for example, gradient descent methods. An example gradient descent method comprises evaluating the partial derivative of the cost function with respect to the tuning variables. The sign and magnitude of the partial derivatives indicate whether the choice of a new tuning variable value will reduce the cost function, thereby optimizing the linear regression algorithm. A new tuning variable value is selected depending on a set threshold. Depending on the machine learning module, a steep or gradual negative slope is selected. Both the cost function and gradient descent can be used with other algorithms and modules mentioned throughout. For the sake of brevity, both the cost function and gradient descent are well known in the art and are applicable to other machine learning algorithms and may not be mentioned with the same detail.

LiR models may have many levels of complexity comprising one or more independent variables. Furthermore, in an LiR function with more than one independent variable, each independent variable may have the same one or more tuning variables or each, separately, may have their own one or more tuning variables. The number of independent variables and tuning variables will be understood to one skilled in the art for the problem being solved.

Logistic Regression (LoR)

In one example embodiment, logistic regression machine learning is implemented. Logistic Regression, often considered a LiR type model, is typically used in machine learning to classify information. LoR takes advantage of probability to predict an outcome from input data. However, what makes LoR different from a LiR is that LoR uses a more complex logistic function, for example a sigmoid function. In addition, the cost function can be a sigmoid function limited to a result between 0 and 1. For example, the sigmoid function can be of the form $f(x)=1/(1+e^{-x})$, where x represents some linear representation of input features and tuning variables. Similar to LiR, the tuning variable(s) of the cost function are optimized (typically by taking the log of some variation of the cost function) such that the result of the cost function, given variable representations of the input features, is a number between 0 and 1, preferably falling on either side of 0.5. As described in LiR, gradient descent may also be used in LoR cost function optimization and is an example of the process.

Random Forest

In one example embodiment, random forest may be implemented. RF consists of an ensemble of decision trees producing individual class predictions. The prevailing prediction from the ensemble of decision trees becomes the RF prediction. Decision trees are branching flowchart-like graphs comprising of the root, nodes, edges/branches, and leaves. The root is the first decision node from which feature information is assessed and from it extends the first set of edges/branches. The edges/branches contain the information of the outcome of a node and pass the information to the next node. The leaf nodes are the terminal nodes that output the prediction. Decision trees can be used for both classification as well as regression and is typically trained using supervised learning methods. Training of a decision tree is sensitive to the training data set. An individual decision tree may become over or under-fit to the training data and result in a poor predictive model. Random forest compensates by using multiple decision trees trained on different data sets.

Gradient Boosting

In an example embodiment, gradient boosting is implemented. Gradient boosting is a method of strengthening the evaluation capability of a decision tree node. In general, a tree is fit on a modified version of an original data set. For example, a decision tree is first trained with equal weights across its nodes. The decision tree is allowed to evaluate data to identify nodes that are less accurate. Another tree is added to the model and the weights of the corresponding underperforming nodes are then modified in the new tree to improve their accuracy. This process is performed iteratively until the accuracy of the model has reached a defined threshold, or a defined limit of trees has been reached. Less accurate nodes are identified by the gradient of a loss function. Loss functions must be differentiable such as a linear or logarithmic functions. The modified node weights in the new tree are selected to minimize the gradient of the loss function.

Neural Networks

In one example embodiment, Neural Networks are implemented. NNs are a family of statistical learning models influenced by biological neural networks of the brain. NNs can be trained on a relatively large dataset (e.g., 50,000 or more) and used to estimate, approximate, or predict an output that depends on a large number of inputs/features. NNs can be envisioned as so-called "neuromorphic" systems of interconnected processor elements, or "neurons", and exchange electronic signals, or "messages". Like the so-called "plasticity" of synaptic neurotransmitter connections that carry messages between biological neurons, the connections in NNs that carry electronic "messages" between "neurons" are provided with numeric weights that correspond to the strength or weakness of a given connection. The weights can be tuned based on experience, making NNs adaptive to inputs and capable of learning. For example, an NN is defined by a set of input neurons that can be given input data. The input neuron weighs and transforms the input data and passes the result to other neurons, often referred to as "hidden" neurons. This is repeated until an output neuron is activated. The activated output neuron produces a result.

Convolutional Autoencoder

In example embodiments, convolutional autoencoder (CAE) is implemented. A CAE is a type of neural network and comprises, in general, two main components. First, the convolutional operator that filters an input signal to extract features of the signal. Second, an autoencoder that learns a set of signals from an input and reconstructs the signal into an output. By combining these two components, the CAE learns the optimal filters that minimize reconstruction error resulting an improved output. CAEs are trained to only learn filters capable of feature extraction that can be used to reconstruct the input. Generally, convolutional autoencoders implement unsupervised learning.

Deep Learning

In example embodiments, deep learning is implemented. Deep learning expands the neural network by including more layers of neurons. A deep learning module is characterized as having three "macro" layers: (1) an input layer which takes in the input features, and fetches embeddings for the input, (2) one or more intermediate (or hidden) layers which introduces nonlinear neural net transformations to the inputs, and (3) a response layer which transforms the final results of the intermediate layers to the prediction.

Recurrent Neural Network (RNN)

In an example embodiment, a recurrent neural network is implemented. RNNs are class of NNs further attempting to replicate the biological neural networks of the brain. RNNs comprise of delay differential equations on sequential data or time series data to replicate the processes and interactions of the human brain. RNNs have "memory" wherein the RNN can take information from prior inputs to influence the current output. RNNs can process variable length sequences of inputs by using their "memory" or internal state information. Where NNs may assume inputs are independent from the outputs, the outputs of RNNs may be dependent on prior elements with the input sequence. See Sherstinsky, Alex. "Fundamentals of recurrent neural network (RNN) and long short-term memory (LSTM) network." Physica D: Nonlinear Phenomena 404 (2020): 132306.

Long Short-Term Memory (LSTM)

In an example embodiment, a Long Short-term Memory is implemented. LSTM are a class of RNNs designed to overcome vanishing and exploding gradients. In RNNs, long term dependencies become more difficult to capture because the parameters or weights either do not change with training or fluctuate rapidly. This occurs when the RNN gradient exponentially decreases to zero, resulting in no change to the weights or parameters, or exponentially increases to infinity, resulting in large changes in the weights or parameters. This exponential effect is dependent on the number of layers and multiplicative gradient. LSTM overcomes the vanishing/exploding gradients by implementing "cells" within the hidden layers of the NN. The "cells" comprise three gates: an input gate, an output gate, and a forget gate. The input gate reduces error by controlling relevant inputs to update the current cell state. The output gate reduces error by controlling relevant memory content in the present hidden state. The forget gate reduces error by controlling whether prior cell states are put in "memory" or forgotten. The gates use activation functions to determine whether the data can pass through the gates. While one skilled in the art would recognize the use of any relevant activation function, example activation functions are sigmoid, tanh, and RELU. See Zhu, Xiaodan, et al. "Long short-term memory over recursive structures." International Conference on Machine Learning. PMLR, 2015.

Convolutional Neural Network (CNN)

In an example embodiment, a convolutional neural network is implemented. CNNs is a class of NNs further attempting to replicate the biological neural networks, but of the animal visual cortex. CNNS process data with a grid pattern to learn spatial hierarchies of features. A typical CNN comprises of three layers: convolution, pooling, and fully connected. The convolution and pooling layers extract features, such as those described herein. The convolutional layer comprises of multiple mathematical operations such as of linear operations, a specialized type being a convolution. The fully connected layer combines the extracted features into an output. The input data may be represented in a grid, i.e., an array of numbers. A grid of parameters, called a kernel, operates as an optimizable feature extractor and is applied to each position in the grid. Extracted features may become hierarchically more complex as one layer feeds its output into the next layer.

See Yamashita, R., et al Convolutional neural networks: an overview and application in radiology. *Insights Imaging* 9, 611-629 (2018).

Matrix Factorization

In example embodiments, Matrix Factorization is implemented. Matrix factorization machine learning exploits inherent relationships between two entities drawn out when multiplied together. Generally, the input features are mapped to a matrix F which is multiplied with a matrix R containing the relationship between the features and a predicted outcome. The resulting dot product provides the prediction. The matrix R is constructed by assigning random values throughout the matrix. In this example, two training matrices are assembled. The first matrix X contains training input features, and the second matrix Z contains the known output of the training input features. First the dot product of R and X are computed and the square mean error, as one example method, of the result is estimated. The values in R are modulated and the process is repeated in a gradient descent style approach until the error is appropriately minimized. The trained matrix R is then used in the machine learning model. In example embodiments, data associated with one or more network devices of a network system are used to train the relationship matrix R in a matrix factorization machine learning module. After training, the relationship matrix R and input matrix F results in the prediction matrix P.

Hidden Markov Model

In example embodiments, a hidden Markov model is implemented. An HMM takes advantage of the statistical Markov model to predict an outcome. A Markov model assumes a Markov process, wherein the probability of an outcome is solely dependent on the previous event. In the case of HMM, it is assumed an unknown or "hidden" state is dependent on some observable event. An HMM comprises a network of connected nodes. Traversing the network is dependent on three model parameters: start probability; state transition probabilities; and observation probability. The start probability is a variable that governs, from the input node, the most plausible consecutive state. From there, each node i has a state transition probability to node j. Typically, the state transition probabilities are stored in a matrix $M_{ij}$ wherein the sum of the rows, representing the probability of state i transitioning to state j, equals 1. The observation probability is a variable containing the probability of output o occurring. These too are typically stored in a matrix $N_{oj}$ wherein the probability of output o is dependent on state j. To build the model parameters and train the HMM, the state and output probabilities are computed. This can be accomplished with, for example, an inductive algorithm. Next, the state sequences are ranked on probability, which can be accomplished, for example, with the Viterbi algorithm. Finally, the model parameters are modulated to maximize the probability of a certain sequence of observations. This is typically accomplished with an iterative process wherein the neighborhood of states is explored, the probabilities of the state sequences are measured, and model parameters updated to increase the probabilities of the state sequences.

Support Vector Machine

In example embodiments, support vector machines are implemented. SVMs separate data into classes defined by n-dimensional hyperplanes (n-hyperplane) and are used in both regression and classification problems. Hyperplanes are decision boundaries developed during the training process of an SVM. The dimensionality of a hyperplane depends on the number of input features. For example, a SVM with two input features will have a linear (1-dimensional) hyperplane while a SVM with three input features will have a planer (2-dimensional) hyperplane. A hyperplane is optimized to have the largest margin or spatial distance from the nearest data point for each data type. In the case of simple linear regression and classification a linear equation is used to develop the hyperplane. However, when the features are more complex a kernel is used to describe the hyperplane. A kernel is a function that transforms the input features into higher dimensional space. Kernel functions can be linear, polynomial, a radial distribution function (or gaussian radial distribution function), or sigmoidal.

K-Means Clustering

In one example embodiment, K-means clustering is implemented. KMC assumes data points have implicit shared characteristics and "clusters" data within a centroid or "mean" of the clustered data points. During training, KMC adds a number of k centroids and optimizes its position around clusters. This process is iterative, where each centroid, initially positioned at random, is re-positioned towards the average point of a cluster. This process concludes when the centroids have reached an optimal position within a cluster. Training of a KMC module is typically unsupervised.

K-Nearest Neighbor

In one example embodiment, K-nearest neighbor is implemented. On a general level, KNN shares similar characteristics to KMC. For example, KNN assumes data points near each other share similar characteristics and computes the distance between data points to identify those similar characteristics but instead of k centroids, KNN uses k number of neighbors. The k in KNN represents how many neighbors will assign a data point to a class, for classification, or object property value, for regression. Selection of an appropriate number of k is integral to the accuracy of KNN. For example, a large k may reduce random error associated with variance in the data but increase error by ignoring small but significant differences in the data. Therefore, a careful choice of k is selected to balance overfitting and underfitting. Concluding whether some data point belongs to some class or property value k, the distance between neighbors is computed. Common methods to compute this distance are Euclidean, Manhattan or Hamming to name a few. In some embodiments, neighbors are given weights depending on the neighbor distance to scale the similarity between neighbors to reduce the error of edge neighbors of one class "out-voting" near neighbors of another class. In one example embodiment, k is 1 and a Markov model approach is utilized.

To perform one or more of its functionalities, the machine learning module may communicate with one or more other systems. For example, an integration system may integrate the machine learning module with one or more email servers, web servers, one or more databases, or other servers, systems, or repositories. In addition, one or more functionalities may require communication between a user and the machine learning module.

Any one or more of the modules described herein may be implemented using hardware (e.g., one or more processors of a computer/machine) or a combination of hardware and software. For example, any module described herein may configure a hardware processor (e.g., among one or more hardware processors of a machine) to perform the operations described herein for that module. In some example embodiments, any one or more of the modules described herein may comprise one or more hardware processors and may be configured to perform the operations described herein. In certain example embodiments, one or more hardware processors are configured to include any one or more of the modules described herein.

Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices. The multiple machines, databases, or devices are communicatively coupled to enable communications between the multiple machines, databases, or devices. The modules themselves are communicatively coupled (e.g., via appropriate interfaces) to each other and to various data sources, to allow information to be passed between the applications to allow the applications to share and access common data.

Example Systems

GPU Computing

GPU computing is the use of a GPU (graphics processing unit) as a co-processor to accelerate CPUs for general-purpose scientific and engineering computing. GPUs started initially for video rendering and image processing. Then it became widely used in AI applications especially deep learning. GPUS has hundreds and thousands of cores that can help process many bits of data at the same time. GPUs can accelerate matrix multiplication processes, which is the core process of deep learning.

Now there are GPUs that are designed and built specifically for AI and deep learning solutions. Training a deep learning model with thousands of trainable parameters can now take hours instead of days and weeks with the help GPU servers. With the advancements in AI and Deep learning and the complexity of the new developed architectures, GPUs are becoming a mandatory part of the AI systems not optional.

Quantum Computing

Quantum computing is a type of computation whose operations are inspired from quantum mechanics, such as superposition, interference, and entanglement. Devices that perform quantum computations are known as quantum computers. In quantum Computing "qubits" are used instead of "bits," which are used by classical computers. The term "qubit" stands for Quantum Binary Digit. While bits have only two states—0 and 1—qubits can have multiple states at the same time. The value ranges between 0 and 1.

Quantum machine learning is the use of quantum computing techniques within machine learning algorithms. The main goal of Quantum Machine Learning is to accelerate the processing of machine learning programs by applying what we know from quantum computing. Now, Quantum machine learning can solve linear algebraic problems, principal component analysis, support vector machines, optimization and deep learning and others.

FIG. 7 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components, for example, a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor (DSP), an application specific integrated circuit (ASIC), a graphics processing unit (GPU), a field programmable gate array (FPGA), a programmable logic device (PLD), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories, for example, read-only memory (ROM), programmable read-only memory (PROM), erasable programmable read-only memory (EPROM), flash memory, or any other device capable of storing program instructions or data with or without applied power. The system memory 2030 may also include volatile memories, for example, random access memory (RAM), static random access memory (SRAM), dynamic random access memory (DRAM), and synchronous dynamic random access memory (SDRAM). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device, for example, the storage media 2040.

The storage media 2040 may include a hard disk, a floppy disk, a compact disc read only memory (CD-ROM), a digital versatile disc (DVD), a Blu-ray disc, a magnetic tape, a flash memory, other non-volatile memory device, a solid state drive (SSD), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules, for example, module 2050, data, or any other information. The storage media 2040 may be part of, or connected to, the computing machine 2000. The storage media 2040 may also be part of one or more other computing machines that are in communication with the computing machine 2000, for example, servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits, for example, microcode or configuration information for an FPGA or other PLD.

The input/output (I/O) interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, for example, small computer system interface (SCSI), serial-attached SCSI (SAS), fiber channel, peripheral component interconnect (PCI), PCI express (PCIe), serial bus, parallel bus, advanced technology attached (ATA), serial ATA (SATA), universal serial bus (USB), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touchscreens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, or any topology, and may use any communication protocol. Communication links within the network 2080 may involve various digital or analog communication media, for example, fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device, for example, a system on chip (SOC), system on package (SOP), or ASIC device.

Examples may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing examples in computer programming, and the examples should not be construed as limited to any one set of computer program instructions. Further, a skilled programmer would be able to write such a computer program to implement an example of the disclosed examples based on the appended flow charts and associated description in the application text. Therefore, disclosure of a particular set of program code instructions is not considered necessary for an adequate understanding of how to make and use examples. Further, those skilled in the art will appreciate that one or more aspects of examples described herein may be performed by hardware, software, or a combination thereof, as may be embodied in one or more computing systems. Additionally, any reference to an act being performed by a computer should not be construed as being performed by a single computer as more than one computer may perform the act.

The examples described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different example examples, and/or certain additional acts can be performed, without departing from the scope and spirit of various examples. Accordingly, such alternative examples are included in the scope of the following claims, which are to be accorded the broadest interpretation so as to encompass such alternate examples.

Although specific examples have been described above in detail, the description is merely for purposes of illustration. It should be appreciated, therefore, that many aspects described above are not intended as required or essential elements unless explicitly stated otherwise.

Modifications of, and equivalent components or acts corresponding to, the disclosed aspects of the examples, in addition to those described above, can be made by a person of ordinary skill in the art, having the benefit of the present disclosure, without departing from the spirit and scope of examples defined in the following claims, the scope of which is to be accorded the broadest interpretation so as to encompass such modifications and equivalent structures.

What is claimed is:

1. A system to provide connections to use artificial intelligence to discover, classify and protect data on network devices, comprising:

a processor coupled to a storage device, wherein the processor executes application code instructions that are stored in the storage device to cause the system to:
- receive data associated with one or more network devices of a network system;
- use artificial intelligence to analyze the data to identify sensitive data;
- use artificial intelligence to validate the identified sensitive data;
- use artificial intelligence to match sensitive data with regulated data;
- use artificial intelligence to classify files to international standard labels;
- use artificial intelligence to train on classified data with custom labels;
- use artificial intelligence to classify data with the custom labels; and
- use artificial intelligence to suggest security policies based on the classified data.

2. The system of claim 1, further comprising application code instructions to cause the system to display a graphical user interface representing one or more security alerts for the one or more network devices of the network system.

3. The system of claim 2, wherein the graphical user interface indicates the one or more security alerts for each of the one or more network devices of the network system based on a color or other visual indicator.

4. The system of claim 2, wherein the one or more security alerts are based on the sensitive data, the regulated data, and the classified data.

5. The system of claim 1, wherein the artificial intelligence used to identify sensitive data and matched regulated data is performed with a deep learning model.

6. The system of claim 5, further comprising application code instructions to generate an intermediate representation of the classified data, the intermediate representation only readable by the deep learning model.

7. The system of claim 1, wherein validating the identified sensitive data reduces false positive sensitive data results.

8. The system of claim 1, further comprising application code instructions to cause the system to build a graph of identified sensitive data, matched regulation data, and classified data.

9. A method to use artificial intelligence to discover, classify and protect data on network devices, comprising:

by one or more computing devices:
- receiving data associated with one or more network devices of a network system;
- using artificial intelligence to analyze the data to identify sensitive data;
- using artificial intelligence to validate the identified sensitive data;
- using artificial intelligence to match sensitive data with regulated data;
- using artificial intelligence to classify files to international standard labels;
- using artificial intelligence to train on classified data with custom labels;
- using artificial intelligence to classify data with the custom labels; and
- using artificial intelligence to suggest security policies based on the classified data.

10. The method of claim 9, further comprising displaying a graphical user interface representing one or more security alerts for the one or more network devices of the network system.

11. The method of claim 10, wherein the graphical user interface indicates the one or more security alerts for each of the one or more network devices of the network system based on a color or other visual indicator.

12. The method of claim 10, wherein the one or more security alerts are based on the sensitive data, the regulated data, and the classified data.

13. The method of claim 9, wherein the artificial intelligence used to identify sensitive data and matched regulated data is performed with a deep learning model.

14. The method of claim 13, further comprising generating an intermediate representation of the classified data, the intermediate representation only readable by the deep learning model.

15. The method of claim 9, wherein validating the identified sensitive data reduces false positive sensitive data results.

16. The method of claim 9, further comprising building a graph of identified sensitive data, matched regulation data, and classified data.

17. A computer program product, comprising:

a non-transitory computer-readable medium having computer-readable program instructions embodied thereon, the computer-readable program instructions comprising computer-readable program instructions to:
- receive data associated with one or more network devices of a network system;
- use artificial intelligence to analyze the data to identify sensitive data;
- use artificial intelligence to validate the identified sensitive data;
- use artificial intelligence to match sensitive data with regulated data;

use artificial intelligence to classify files to international standard labels;

use artificial intelligence to train on classified data with custom labels;

use artificial intelligence to classify data with the custom labels; and use artificial intelligence to suggest security policies based on the classified data.

18. The computer program product of claim 17, further comprising computer-readable program instructions to cause the system to display a graphical user interface representing one or more security alerts for the one or more network devices of the network system.

19. The computer program product of claim 17, wherein the artificial intelligence to identify sensitive data and matched regulated data is performed with a deep learning model.

20. The computer program product of claim 17, further comprising computer-readable program instructions to cause the system to build a graph of identified sensitive data, matched regulation data, and classified data.

* * * * *